United States Patent Office 3,329,707
Patented July 4, 1967

3,329,707
HALIDE ADDITION PROCESS FOR PRODUCING HALOGENATED CARBONYLIC COMPOUND
Harvey S. Klein, Berkeley, and Frederick F. Rust, Orinda, Calif., assignors to Shell Oil Company, New York, N.Y., a corporation of Delaware
No Drawing. Filed Feb. 6, 1964, Ser. No. 343,150
The portion of the term of the patent subsequent to Mar. 8, 1983, has been disclaimed
12 Claims. (Cl. 260—486)

This invention relates to an improved method for the production of certain halogenated carbonylic compounds. More particularly, it relates to an improved method for the addition of certain α-halo carbonylic compounds to olefins.

The peroxide-catalyzed addition of certain α-halo carbonylic compounds to olefins is known in the art. Kharasch et al., J. Am. Chem. Soc., 67, 1626 (1945), describe the addition of trichloroacetyl chloride and methyl dichloroacetate to octene-1 in the presence of acetyl peroxide. In the reaction of the completely halogenated acid chloride, cleavage of the bond between the α-carbon atom and a halogen substituent is apparently observed, as the product that results appears to arise from the addition of the moieties produced thereby to the ethylenic linkage of the unsaturate. When a similar procedure was employed to react methyl dichloroacetate with octene-1, however, the bond apparently broken was that between the α-carbon atom and the hydrogen substituent. The formation of α,α-dichlorodecanoic acid was observed, and the α-halogen substituents did not enter into the reaction. It therefore appears that the peroxide-catalyzed addition of α-halo carbonylic compounds is not entirely general, or is at least dependent upon the particular type of carbonylic compound employed or the number of α-halo substituents. It would be of advantage to provide a more general reaction process for the addition of α-halo carbonylic compounds to olefins.

It is an object of this invention to provide an improved method for the production of certain halogenated carbonylic compounds. More particularly, it is an object to provide an improved process for the addition of α-(di- to polyhalo) carbonylic compounds to organic molecules possessing ethylenic unsaturation.

It has now been found that these objects are accomplished by the process for the addition of α-halo carbonylic compounds which possess at least two halogen substituents upon at least one carbon atom which is attached to the carbon atom of a carbon-oxygen double bond, to an ethylenically unsaturated organic molecule in liquid-phase solution in inert solvent in the presence of certain metallic compounds as catalyst.

The metallic compounds which have been found to be useful catalysts in the process of the invention are iron compounds, particularly iron salts comprising iron cations, either in the ferrous or ferric oxidation state, and simple anions, either organic or inorganic. Although iron compounds such as the acetate, nitrate, sulfate and the like are operable, best results are obtained when the catalyst employed is a halide, e.g., fluoride, chloride, bromide or iodide. Preferred are iron halides wherein the halogen has an atomic number from 17 to 35, that is, the middle halogens chlorine and bromine. Although in general the ferrous salts are preferred over the corresponding ferric salt, in most cases ferric salts give satisfactory results. Particularly preferred as catalyst for the process of the invention is ferrous chloride.

The halogenated carbonylic compounds employed as reactants in the process of the invention are α-(di- to polyhalo) carbonylic compounds possessing at least two halogen substituents upon at least one carbon atom which is alpha to a carbonyl group, i.e., a carbon-oxygen double bond. Such compounds are typified by aldehydes, ketones, carboxylic acids, carboxylic acid anhydrides, carboxylic acid chlorides, carboxylic acid esters and carboxylic acid amides wherein at least one carbon atom alpha to a carbonyl group is substituted with at least two halogen substituents. Preferred α-halo carbonylic compounds are non-hydroxylic, are mono-carbonylic, that is, contains only a single carbon-oxygen double bond, and contain only atoms of carbon, hydrogen and halogen besides the oxygen atom(s) of the functional group containing the carbonylic moiety. One class of such halohydrocarbon carbonylic compounds contains from 2 to 12 carbon atoms and is represented by the formula

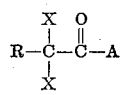

wherein X is halogen, e.g., fluorine, chlorine, bromine or iodine; R is X, hydrogen, alkyl or haloalkyl, generically designated (halo)alkyl, wherein the alkyl moiety has from 1 to 10 carbon atoms, preferably from 1 to 4; and A is R or alkoxy having from 1 to 10 carbon atoms, preferably 1 to 4. Preferred halogens in the above-depicted formula are halogens having an atomic number from 17 to 35, and most preferred is chlorine.

Exemplary compounds of the above-depicted formula include α-halo aldehydes such as dichloroacetaldehyde, chloral, α,α-dichloropropionaldehyde, α,α-dibromobutyraldehyde, 2,2-dichlorohexanal, tribromoacetaldehyde and α,α-dichlorovaleraldehyde; α-haloketones such as α,α-dichloroacetone, α,α,α'-tribromoacetone, hexachloroacetone, 1,1-dichlorobutanone, 3,3-dibromo-2-pentanone, 2,2-dichloro-3-hexanone, pentabromoacetone, 4,4-dichloro-3-octanone and 3,3-dichlorobutanone; α-halo carboxylic acid chlorides such as trichloroacetyl chloride, dibromoacetyl bromide, 2,2-dichloropropionyl chloride, α,α-dichlorobutyrylchloride, 2,2-dibromohexanoyl bromide and tribromoacetyl bromide; and α-halo carboxylic acid esters such as methyl dichloroacetate, ethyl trichloroacetate, methyl 2,2-dibromopropionate, butyl tribromoacetate, propyl 2,2-dichlorohexanoate, amyl trichloroacetate and methyl 2,2-dichloropentanoate.

The olefinic reactant of the process of the invention contains one or more ethylenic linkages, i.e., non-aromatic carbon-carbon double bonds, which are not conjugated with non-carbon-carbon unsaturation. By the term "non-carbon-carbon unsaturation" is meant a multiple bond between two atoms at least one of which is not carbon. Thus, such materials as α,β-ethylenically unsaturated nitriles, aldehydes, esters and the like are not satisfactory. The olefinic reactants contain from 2 to 20 carbon atoms, preferably from 2 to 12, and preferably contain from 1 to 2 ethylenic linkages which may be conjugated or isolated, i.e., non-conjugated, if more than one ethylenic linkage is present. The olefinic reactant is therefore a mono-olefin, a conjugated diene or a di-olefin, which term is herein employed to signify an olefin with two ethylenic linkages which are not conjugated. The olefinic reactant is cyclic or acyclic, and is wholly aliphatic or contains aromatic moieties, but is preferably free from acetylenic unsaturation. The olefinic reactant is preferably hydrocarbon, that is, contains only atoms of carbon and hydrogen, but may be substituted with non-hydrocarbyl substituents such as halogen, preferably having an atomic number of from 17 to 35, acyl, carboalkoxy, acyloxy, alkoxy or the like, which substituents are not detrimental to the process of the invention. Preferred are olefins which are hydrocarbon or contain as the only additional atoms, i.e., non-hydrocarbyl moieties, halogen atoms of atomic number from 17 to 35 or oxygen atoms which are present in a carbonyloxy linkage, i.e., an ester linkage.

Illustrative hydrocarbon olefins include ethylene, propylene, 1-butene, isobutylene, 1-octene, 3,3-dimethyl-1-butene, 3-ethyl-2-pentene, 3,5-diethyl-1-octene, 3-dodecene, biallyl, 1,7-octadiene, cyclohexene, 1,4-cyclooctadiene, vinylbenzene, allylbenzene, 1,3,5-trivinylbenzene, 1,9-decadiene, butadiene, isoprene, cyclopentadiene, 1,3-cyclohexadiene, 2,4-hexadiene and the like, while exemplary substituted hydrocarbon olefins include allyl chloride, allyl acetate, 1-acetoxy-3-butene, methyl 3-butyrate, p-chlorostyrene, 3-bromo-1-butene, methyl m-allylbenzoate, chloroprene, 1-chloro-1,3-cyclooctadiene, 2,3-dichloro-1,3-butadiene, 2-bromo-1,3-heptadiene and the like. In general, acyclic olefins are preferred over the analogous cyclic olefins, olefin reactants wherein at least one ethylenic linkage is terminal are preferred over those olefins wherein all ethylenic linkages are internal, and conjugated dienes are preferred over mono- and di-olefins. Most preferred as olefin is butadiene.

The most suitable molar ratio of reactants will in part depend upon the functionality of the reactants, that is, the number of alpha-carbon atoms which are at least di-halo substituted and the number of unsaturated reaction sites, i.e., the number of isolated ethylenic linkages or conjugated diene moieties present in the molecule, as it is within the contemplated scope of the reaction to combine reactant molecules in a ratio determined by the number of reactive groups present. For example, one molecule possessing two isolated ethylenic linkages may react with two molecules of α-halo carbonylic compound. Alternatively, a carbonylic compound possessing more than one halogen-substituted alpha-carbon atom, e.g., a α,α,α',α'-tetrahaloketone, may react with more than one molecule of olefinic reactant. In general, molar ratios of halogen-substituted alpha-carbon atom to unsaturated reaction site from about 2:1 to about 1:2 are satisfactory, while frequently a molar ratio that is substantially stoichiometric, i.e., a ratio of about 1:1, is advantageously utilized.

The iron compound is employed in catalytic amounts. While the optimum amount of catalyst will depend upon the particular α-halo carbonylic compound, olefin and iron compound employed, amounts of catalyst from about 0.005 mole to about 0.5 mole per mole of limiting reactant are generally satisfactory, while amounts of catalyst from about 0.05 mole to about 0.2 mole per mole of limiting reactant are preferred.

The process of the invention is conducted in liquid-phase solution in an inert solvent. Solvents that are suitable are liquid at reaction temperature and pressure, are capable of dissolving the reactants and are substantially inert toward the α-halo carbonylic compound and the olefinic reactants as well as the products produced therefrom. Preferred solvents are polar, that is, contain uneven charge distribution, and include such solvents as the alcohols, particularly lower monohydric and polyhydric alkanols such as methanol, ethanol, sec-butanol, tert-butanol, 2-ethylhexanol, glycerol, ethylene glycol and 1,2,6-hexantriol as well as the ether alcohols such as the Cellosolves and the Carbitols; the lower alkyl nitriles such as acetonitrile, propionitrile and butyronitrile; esters such as methyl acetate, ethyl propionate, methyl butyrate and butyl acetate; sulfones such as diethyl sulfone, propyl hexyl sulfone and sulfolane; and N,N-dialkylamides such as dimethylformamide and N,N-diethylacetamide. Most satisfactory solvents comprise the nitriles, especially the cyanoalkanes, and particularly preferred as reaction solvent is acetonitrile.

The solvent is employed in molar amounts equivalent to or in excess over either reactant. While a large excess of solvent does not appear to be overly detrimental, molar ratios of solvent to limiting reactant from about 1:1 to about 20:1 are preferred.

The process of the invention is conducted by mixing the reactants, catalyst and solvent and maintaining the reaction mixture at the desired temperature until reaction is complete. The method of mixing is not material. One reactant may be added to the other in increments, although it is equivalently useful to initially mix the entire amounts of reactants. Subsequent to reaction, the product mixture is separated by conventional means such as fractional distillation, selective extraction or crystallization.

The products of the invention are halogen-substituted carbonylic compounds illustratively produced by cleavage of the bond between an alpha-carbon and a halogen substituent thereof and subsequent addition of the moieties thereby produced to the unsaturated reaction site. When the unsaturated reaction site is an isolated ethylenic linkage, addition of the moieties of the α-halo carbonylic compound occurs in a 1,2 manner as is illustrated by the equation below.

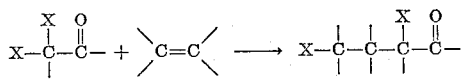

Alternatively, when the unsaturated reaction site comprises a conjugated diene moiety, addition predominantly occurs in a 1,4 manner as illustrated by the following equation.

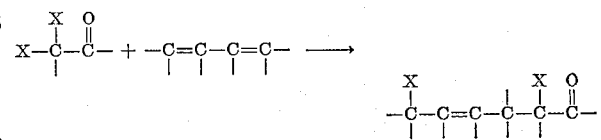

Illustrative of typical products produced by the process of the invention are methyl 2,2,6-trichloro-4-hexenoate, 2,2,4-tribromobutyraldehyde, 3,7-dichloro-5-hepten-2-one, ethyl 2-chloro-2-(2-chlorocyclohexyl)ethanoate, 1,3,3,5, 5,7-hexachloro-4-heptanone, 2,2,6-trichloro-5-methyl-4-hexenoyl chloride, methyl 2,4,5,6-tetrabromo-4-hexanoate, and propyl 2,2,4,5-tetrachloropentanoate.

Because of the number and variety of functional groups present in the products of the invention, the products are extremely useful as chemical intermediates. The halogen substituents of the molecule may be reacted with tertiary amines to produce useful quaternary ammonium salts, or hydrolyzed to the corresponding alcohols from which useful esters or ethers may be produced. In certain products of the invention, the ethylenic linkage that remains may serve as a reactive site for polymerization or co-polymerization, or alternatively may be epoxidized to form useful epoxy resin precursors. In addition, of course, the functional group of the initial α-halo carbonylic compound remains intact and is suitable for conversion to conventional derivatives.

Among particular utilities of the process of the invention is the cross-linking of polydiene elastomers by reaction of the ethylenic linkages remaining therein with a carbonylic compound possessing more than one halogen-substituted alpha-carbon atom, and also in the production of amino acids. For example, a dichloroacetate is added to butadiene to produce a 2,6-dichloro-4-hexenoate which is converted by steps of ammonolysis, hydrogenation and hydrolysis to lysine. In addition, the products of the process of the invention are useful in the area of agricultural chemicals, where, for example, they are particularly useful as precursors of insecticides and the like.

To further illustrate the process of the invention, the following examples are provided. It should be understood that they are not to be regarded as limitations, as the teachings thereof may be varied as will be understood by one skilled in this art.

*Example I*

To a glass tube was charged 0.7 g. of butadiene, 2.4 g. of ethyl trichloroacetate, 0.15 g. of ferrous chloride and 2.5 ml. of acetonitrile. The tube was sealed and the reaction mixture was heated for 6 hours at 120° C. Upon cooling, the tube was opened, the reaction mixture was washed with water and the organic phase was dried over magnesium sulfate. Gas-liquid chromatographic analysis indicated the product, ethyl 2,2,6-trichloro-4-hexenoate, B.P. 260° C. with decomposition, $n_D^{25}$ 1.4835, was produced in 95% yield based upon a conversion of 75%. The infrared and nuclear magnetic resonance spectra were consistent with the above structure.

*Analysis.*—Calc.: C, 39.2% wt.; H, 4.5% wt.; Cl, 43.2% wt. Found: C, 39.3% wt.; H, 4.4% wt.; Cl, 43.1% wt.

Similar results are obtained when ferric chloride is employed as the catalyst.

Example II

To a glass tube was charged 8 g. of chloral, 3 g. of butadiene, 0.5 g. ferrous chloride and 10 ml. of acetonitrile. The tube was sealed and the mixture heated at 90° C. for 24 hours. The tube was cooled and opened and the contents were washed with water and the organic phase was dried. Gas-liquid chromatographic analysis indicated that the product, 2,2,6-trichloro-4-hexenal, obtained as the monohydrate, B.P. 220° C. with decomposition, $n_D^{25}$ 1.5112, was obtained in 95% yield based upon a 20% conversion. The infrared and nuclear magnetic resonance spectra were consistent with the above formula.

*Analysis.*—Calc.: Cl, 48.6% wt. Found: Cl, 48.9% wt.

Example III

By the procedure of Example I, 14 g. of trichloroacetyl chloride was reacted with 4.2 g. of pentene-1 in the presence of 0.5 g. of ferrous chloride and 15 ml. of acetonitrile at 80–85° C. for 18 hours. The product, 2,2,4-trichloroheptanoic acid which was formed from the acid chloride by hydrolysis during work-up, was obtained in 18% yield based upon a conversion of 91%.

*Analysis.*—Calc.: C, 36.2% wt.; H, 4.7% wt. Found: C, 36.0% wt.; H, 4.8% wt.

Example IV

By a procedure similar to that of Example I, 2.8 g. of methyl dichloroacetate was reacted with 1.5 g. of penten-1 in the presence of 0.2 g. of ferrous chloride and 5 ml. of acetonitrile. The product, methyl 2,4-dichloroheptanoate, was obtained as a mixture of two diastereoisomeric pairs in essentially theoretical yield based upon a conversion of 15%. The diastereoisomeric pair comprising 55% of the product mixture had a boiling point of 237° C. and an index of refraction, $n_D^{25}$, of 1.4548, and the pair comprising 45% of the product had a boiling point of 233° C. and an index of refraction, $n_D^{25}$, of 1.4538.

Example V

To a glass tube was charged 13.4 g. of hexachloroacetone, 6.5 g. of butadiene, 1 g. of ferrous chloride and 20 ml. of acetonitrile. The reaction mixture was heated for 16 hours at 115° C. The product mixture was washed with water and dried, and the volatile material was removed under reduced pressure. The weight of the product, 1,5,5,7,7,11 - hexachloroundeca - 2,9 - diene-6-one, $n_D^{25}$ 1.5266, was 15.37 g.

Example VI

By a procedure similar to that of Example I, 1.4 g. of methyl dichloroacetate, 0.8 g. of allyl chloride, 0.15 g. of ferrous chloride and 2.5 ml. of acetonitrile were mixed and heated at 130° C. for 15 hours. The product, methyl 2,4,5-trichloropentanoate, B.P. 243° C., $n_D^{25}$ 1.4791, was obtained in 90% yield based upon a conversion of 14%.

*Analysis.*—Calc.: C, 32.8% wt.; H, 4.1% wt.; Cl, 48.5% wt. Found: C, 33.4% wt.; H, 4.2% wt.; Cl, 47.7% wt.

In a similar process, an approximately 90% yield, based upon a conversion of 9%, of methyl 2,4-dichloro-5-acetoxypentanoate, B.P. 275° C. with decomposition, $n_D^{25}$ 1.4772, was obtained from reaction of 1.4 g. methyl dichloroacetate and 1.0 g. of allyl acetate in the presence of 0.15 g. of ferrous chloride in 2.5 ml. of acetonitrile.

Example VII

By a procedure similar to that of Example I, 2.5 g. of ethyl trichloroacetate was reacted with 1.0 g. of pentene-2 in the presence of 0.2 g. ferrous chloride in 3 ml. of acetonitrile. A 94% yield, based upon a 27% conversion, of the isomeric products ethyl 2,2,4-trichloro-3-methylhexanoate and ethyl 2,2,4-trichloro-3-ethylpentanoate was obtained.

*Analysis.*—Calc.: C, 41.3% wt.; H, 5.7% wt.; Cl, 40.7% wt. Found: C, 41.6% wt.; H, 6.1% wt., Cl, 40.2% wt.

Example VIII

When propyl tribromoacetate is reacted with cyclohexene in the presence of ferric bromide in dimethylformamide solution, a good yield of propyl (2-bromocyclohexyl)dibromoacetate is obtained.

Example IX

When 1,1,1-tribromopropanone is reacted with biallyl in acrylonitrile solution in the presence of ferric bromide, a good yield of 3,3,5,8,10,10-hexabromododeca-2,11-dione is obtained.

We claim as our invention:

1. The process for the production of halogenated carbonylic compound by reacting non-hydroxylic halohydrocarbon mono-carbonylic compound of 2 to 12 carbon atoms having at least two halogen substituents, said halogens having an atomic number from 17 to 35, upon at least one carbon atom alpha to said carbonylic moiety but having no more than two halogen substituents on any one carbon atom alpha to said carbonylic moiety, with olefin having from 1 to 2 ethylenic linkages which are not conjugated with non-carbon-carbon unsaturation and having from 2 to 20 carbon atoms, in liquid-phase solution in inert solvent in the presence of a catalytic amount of iron halide as catalyst.

2. The process of claim 1 wherein the iron halide is a ferrous halide.

3. The process for the production of halogenated aldehydes by reacting chlorohydrocarbon mono-aldehyde having at least two chlorine substituents but no more than two chlorine substituents on the carbon atom alpha to the aldehyde moiety and having from 2 to 12 carbon atoms, with acyclic hydrocarbon olefin having from 2 to 12 carbon atoms and having from 1 to 2 ethylenic linkages at least one of which is a terminal ethylenic linkage, in liquid-phase solution in inert solvent in the presence of a catalytic amount of ferrous chloride.

4. The process of claim 3 wherein the olefin is a conjugated diene.

5. The process for the production of halogenated esters by reacting mono-ester wherein the alcohol moiety is alkyl having from 1 to 10 carbon atoms and the acid moiety is chlorohydrocarbon having from 2 to 12 carbon atoms and having at least two chlorine substituents but no more than two chlorine substituents on the carbon atom alpha to the carbonylic moiety, with acyclic hydrocarbon olefin having from 2 to 12 carbon atoms and having from 1 to 2 ethylenic linkages at least one of which is a terminal ethylenic linkage, in liquid-phase solution in inert solvent in the presence of a catalytic amount of ferrous chloride.

6. The process for the production of chlorinated esters by reacting alkyl dichloroacetate wherein the alkyl moiety has from 1 to 4 carbon atoms with acyclic hydrocarbon olefin having from 2 to 12 carbon atoms and from 1 to 2 ethylenic linkages at least one of which is a terminal olefinic linkage, in liquid-phase solution in inert solvent in the presence of a catalytic amount of ferrous chloride.

7. The process of claim 6 wherein the olefin is a conjugated diene.

8. The process of claim 6 wherein the olefin is butadiene.

9. The process for the production of halogenated ketones by reacting chlorohydrocarbon mono-ketone having at least two chlorine substituents on at least one carbon atom alpha to the carbonylic moiety but no more than two chlorine substituents on any one carbon atom alpha to said carbonylic moiety and having from 2 to 12 carbon atoms, with acyclic hydrocarbon olefin having from 2 to 12 carbon atoms and from 1 to 2 ethylenic linkages at least one of which is a terminal ethylenic linkage, in liquid-phase solution in inert solvent in the presence of a catalytic amount of ferrous chloride.

10. The process of claim 9 wherein the olefin is a conjugated diene.

11. The process of claim 9 wherein the olefin is butadiene.

12. The process for the production of halogenated carbonylic compound by reacting non-hydroxylic, halohydrocarbon monocarbonylic compound of from 2 to 12 carbon atoms of the formula

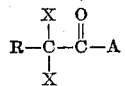

wherein X is halogen of atomic number from 17 to 35, R is X, hydrogen, alkyl of 1 to 10 carbon atoms or haloalkyl of 1 to 10 carbon atoms, and A is R or alkoxy of 1 to 10 carbon atoms, with acyclic olefin having from 1 to 2 ethylenic linkages which are not conjugated with non-carbon-carbon unsaturation, having from 2 to 20 carbon atoms, and having as the only non-hydrocarbyl moieties atoms selected from the group consisting of halogen or oxygen, in liquid-phase solution in inert solvent in the presence of a catalytic amount of ferrous halide as catalyst.

References Cited

UNITED STATES PATENTS 3,239,553  3/1966  Rust et al. _____ 260—534 X

OTHER REFERENCES

Leto et al.: J. Organic Chem., vol. 27 (October 1962), pages 3708–3710.

Walling: "Free Radicals in Solution," John Wiley and Sons, New York, 1947.

LORRAINE A. WEINBERGER, *Primary Examiner.*

ALBERT P. HALLUIN, *Assistant Examiner.*